US007609768B2

(12) United States Patent  
Chung

(10) Patent No.: US 7,609,768 B2  
(45) Date of Patent: Oct. 27, 2009

(54) VIDEO BUFFER CONTROL APPARATUS FOR DUAL VIDEO DECODING AND DIGITAL BROADCASTING RECEIVER THEREOF

(75) Inventor: Tae Il Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 942 days.

(21) Appl. No.: 11/045,203

(22) Filed: Jan. 27, 2005

(65) Prior Publication Data

US 2005/0163226 A1    Jul. 28, 2005

(30) Foreign Application Priority Data

Jan. 27, 2004    (KR) ...................... 10-2004-0005059

(51) Int. Cl.
*H04N 7/12*    (2006.01)
(52) U.S. Cl. ..................................... 375/240.25; 725/86
(58) Field of Classification Search ................. 348/555, 348/445, 458, 384, 731, 564; 386/46, 125, 386/123; 375/240.25, 240.12, 240.26, 240.28, 375/240.2; 725/86, 91
See application file for complete search history.

(56) References Cited

U.S. PATENT DOCUMENTS

| 6,799,246 | B1 * | 9/2004 | Wise et al. ................... 711/117 |
| 2003/0002584 | A1 * | 1/2003 | Campisano et al. ..... 375/240.21 |
| 2003/0021346 | A1 * | 1/2003 | Bixby et al. ........... 375/240.25 |
| 2003/0081936 | A1 * | 5/2003 | Kim ............................. 386/46 |
| 2003/0123855 | A1 * | 7/2003 | Okada et al. ................... 386/98 |
| 2004/0268088 | A1 * | 12/2004 | Lippincott et al. ............. 712/25 |
| 2005/0053353 | A1 * | 3/2005 | Suh .............................. 386/46 |

* cited by examiner

*Primary Examiner*—Behrooz Senfi
(74) *Attorney, Agent, or Firm*—Lee, Hong, Degerman, Kang & Waimey

(57) ABSTRACT

The present invention provides a video buffer control apparatus for dual video decoding and digital broadcasting receiver. In the present invention, one read block controls the reading of at least two video buffers in performing video decoding on at least two channels, whereby the video buffers can be efficiently controlled and whereby the hardware size of the video buffer control apparatus can be reduced. Moreover, the present invention can simultaneously decode both of the digital broadcasting and a video clip or MPEG still picture having a data format inputted via path different from that of the digital broadcasting.

20 Claims, 4 Drawing Sheets

VIDEO BUFFER CONTROL APPARATUS FOR DUAL VIDEO DECODING AND DIGITAL BROADCASTING RECEIVER THEREOF

This application claims the benefit of the Korean Application No. 10-2004-0005059 filed on Jan. 27, 2004, which is hereby incorporated by reference.

BACKGROUND OF THE INVENTION

1. Field of the Invention

The present invention relates to a digital broadcasting receiver for dual video decoding, and more particularly, to a video buffer control apparatus for dual video decoding of an MPEG2 video decoder.

2. Discussion of the Related Art

Currently, it is a worldwide tendency for digital broadcasting that is already on-air or is ready to launch. Mostly, the digital broadcasting adopts MPEG2 (moving picture experts group 2) as a video standard. An interlacing video mode specification having 1920 (pixels)*1080 (lines) or a progressive mode specification having 1280 (pixels)*720 (lines) corresponds to a main profile high level (MP@HL) specification of MPEG2.

In such a case, a bit rate after compression can have a value close to 20 M/sec. And, a corresponding compression stream includes audio data, video data, and general data for broadcasting information or data broadcasting. Moreover, the video data among them occupy the largest volume in general.

An MPEG2 video decoder in a digital TV receiver is currently implemented by ASIC chip type hardware. Lately, many efforts are made to research and develop a system-on-chip (SOC) that implements a data processing system of the digital TV receiver, which includes an MPEG2 video decoder, audio decoder, video display processor (VDP), on-screen display controller, graphic accelerator, central processor unit, and the like, with one chip. Previously, a data buffer memory is used for a data processing system chip and an operation memory is used for an external CPU. Yet, a current SOC type data processing system chip has a unified memory structure that uses one memory as the operation and data buffer memories.

In such an SOC implementation, it is essential to implement each block having the same function of the previous one with a minimum occupied area in integrating various kinds of hardware on one chip.

In this case, an MPEG encoder of a transmitting side performs compression encoding on high quality video data by applying variable length coding, discrete cosine transform, quantization, motion compensation, and the like thereto.

The compression-encoded video data are multiplexed with audio data and additional data containing general data therein and the like and are then transmitted via a terrestrial wave, cable, satellite, or the like.

A system decoder of a digital TV receiver then separates video, audio, additional data streams from a multiplexed transport (TP) stream through demultiplexing. And, the separated video and audio streams are outputted to a video decoder and an audio decoder, respectively. Moreover, the separated additional data stream is stored in a memory and is then processed by a CPU through software.

In being separated by the system decoder, the video stream, which is real-time data, should be directly outputted to the video decoder via internal buffers for separation of partial packets only without time delay.

Yet, a buffer delay considered by the MPEG encoder of the transmitting side occurs until the video stream is decoded by the video decoder to be displayed. Hence, the video stream needs to be stored in the memory. Thus, the video stream is temporarily stored in the video buffer and is then outputted to the video decoder.

In doing so, the video buffer can be configured to be independent from an external memory or to be built in the external memory. Namely, if the memory is a unified memory, a video buffer area is allocated to the memory and the video stream is stored in the video buffer in the memory. If so, the video decoder reads the video stream stored in the video buffer at an appropriate time to perform video decoding thereon. Namely, the video decoder makes a read request to the video buffer at the appropriate time to match a decoding time intended by the MPEG encoder of the transmitting side, whereby synchronization between audio and video can be achieved.

Meanwhile, as digital broadcasting is performed on a full scale in each country worldwide, it is taken into consideration that two channels are simultaneously viewed on one display screen or that one channel is viewed while another channel is recorded.

For such a consideration, a digital TV receiver mostly performs dual video decoding using a pair of video decoders.

However, video buffer controllers for storing a video stream outputted from a system decoder in a video buffer or reading the video stream from the video buffer to output to a video decoder are needed as many as a number of video decoders. For instance, in case of dual video decoding using a pair of video decoders, a pair of video buffer controllers are needed.

SUMMARY OF THE INVENTION

Accordingly, the present invention is directed to a video buffer control apparatus for dual video decoding and digital broadcasting receiver thereof that substantially obviates one or more problems due to limitations and disadvantages of the related art.

An object of the present invention is to provide a video buffer control apparatus for dual video decoding and digital broadcasting receiver thereof, by which a configuration of a video buffer control unit in the digital broadcasting receiver having dual video decoders is simplified.

Another object of the present invention is to provide a video buffer control apparatus for dual video decoding and digital broadcasting receiver thereof, in which a video buffer is efficiently controlled with minimum hardware in the digital broadcasting receiver allocating a video buffer to an external memory to support the dual video decoding.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a digital broadcasting receiver, which includes a plurality of system decoders, a dual video decoder, and first and second video buffers temporarily storing first and second video streams separated by a plurality of the system decoders, respectively, a video buffer control apparatus for dual video decoding according to the present invention includes a first write unit receiving the first video stream to store therein temporarily, the first write unit storing the temporarily stored first video stream in the first video buffer, a second write unit receiving the second video stream to store therein temporarily, the second write unit storing the temporarily stored second video stream in the second video buffer, and a read unit reading a video stream from a video buffer area storing the video stream of a specific channel to store therein temporarily if the dual video decoder requests the video stream of the specific channel for video decoding, the read unit outputting the temporarily stored video stream to the dual video decoder.

In another aspect of the present invention, a digital broadcasting receiver for dual video decoding includes a plurality of system decoders separating a video stream of a corresponding program from an inputted transport stream to output as first and second video streams, an external memory having first and second video buffer areas allocated thereto to temporarily store the first and second video streams therein for video decoding, respectively, a first write unit receiving the first video stream from the system decoder to temporarily store therein, the first write unit storing the temporarily stored first video stream in a first video buffer of the external memory, a second write unit receiving the second video stream from the system decoder to temporarily store therein, the second write unit storing the temporarily stored second video stream in a second video buffer of the external memory, a dual video decoder performing the dual video decoding if the first and second video streams stored in the first and second video buffers are inputted thereto, and a read unit reading a video stream from a video buffer storing the video stream of a specific program to store therein temporarily if the dual video decoder requests the video stream of the specific program for video decoding, the read unit outputting the temporarily stored video stream to the dual video decoder.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
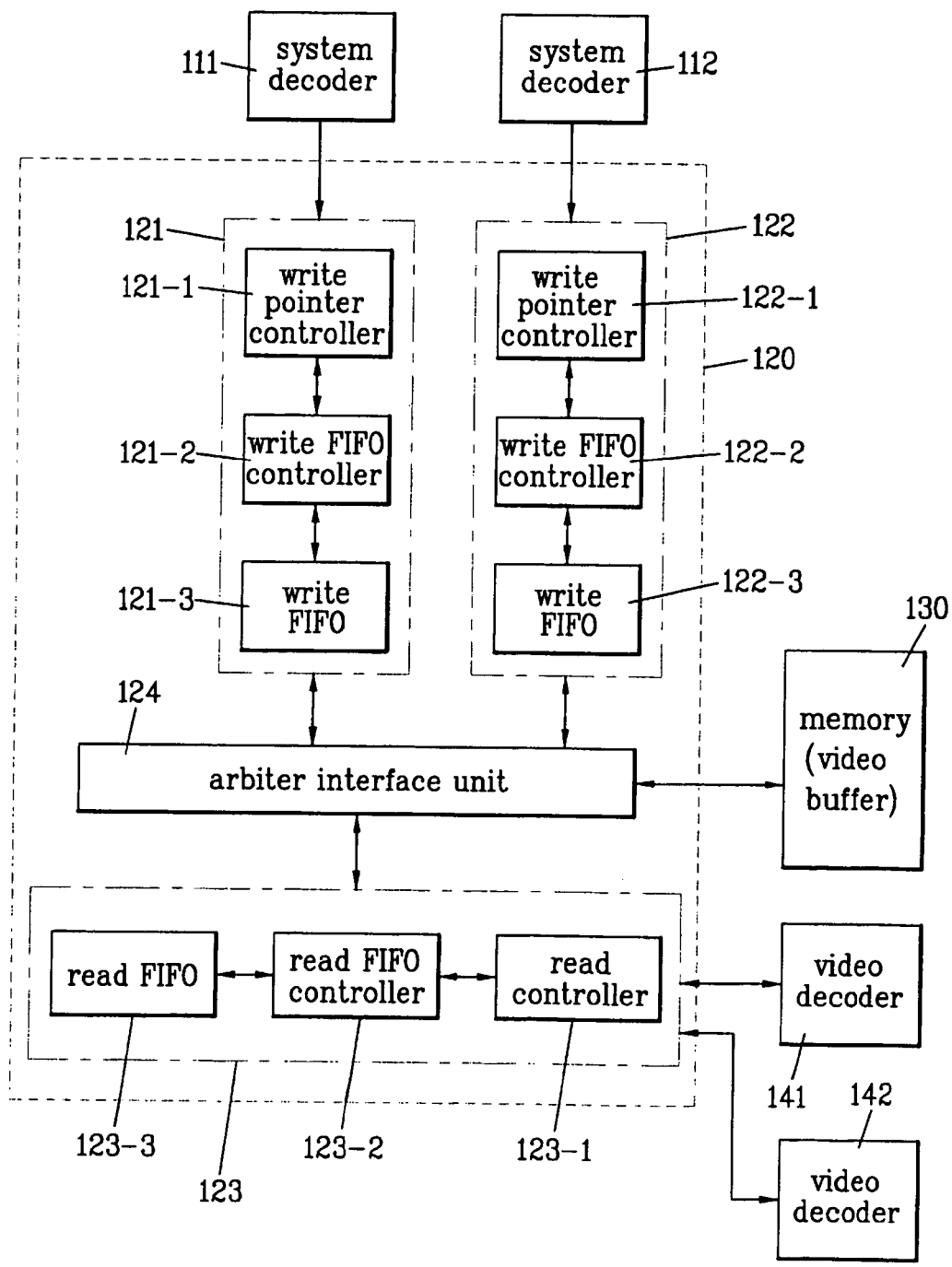
FIG. 1 is a block diagram of a video buffer control apparatus for dual video decoding according to the present invention.

FIG. 1 is a block diagram of a video buffer control apparatus for dual video decoding according to the present invention.

Referring to FIG. 1, a video buffer control unit 120 includes a pair of write units 121 and 122, a read unit 123, and an arbiter interface unit 124. For convenience of the description of the present invention, a reference number '121' indicates a first write unit and a reference number '122' indicates a second write unit.

And, one or two system decoders can be provided to separate audio/video/additional data streams from a multiplexed TP stream. For instance, if there exist two tuners, two system decoders are provided. If a plurality of programs are multiplexed on one channel, each of the system decoders 111 and 112 separates a user-selecting program from the channel and then separates the video/audio/additional data streams from the separated program.

In case of dual video decoding, two video decoders are needed. In this case, a portion of the two video decoders 141 and 142 can be shared.

Optionally, a video buffer temporarily storing the video stream separated by the system decoder therein for video decoding can be allocated to an external memory 130 or can be configured to be independent from the external memory 130. In the embodiment of the present invention, two video buffer areas are allocated to the external memory 130.

A digital TV receiver according to an embodiment of the present invention includes a pair of the system decoders 111 and 112, the video buffer control unit 120, the memory 130 having a video buffer area allocated thereto, and a pair of the video decoders 141 and 142. For convenience of the description of the present invention, reference numbers '111' and '112' indicates first and second system decoders, respectively. And, reference numbers '141' and '142' indicate first and second video decoders, respectively.

Namely, in the digital TV receiver performing dual video decoding, the system decoders 111 and 112 separate the video streams from a TP stream of the corresponding channels and then store the separated video streams in the corresponding video buffer area of the memory 130 via the first and second write units 121 and 122, respectively.

In doing so, the video stream separated by the first system decoder 111 is stored in a first video buffer area allocated to the memory 130 via the first write unit 121 and the video stream separated by the second system decoder 112 is stored in a second video buffer area allocated to the memory 130 via the second write unit 122, which is an exemplary embodiment of the present invention only. Alternatively, the video stream separated by the first system decoder 111 can outputted to the second write unit 133 and the video stream separated by the second system decoder 112 can be outputted to the first write unit 121. Moreover, the first write unit 121 stores the inputted video stream in the second video buffer area of the memory 130 and the second write unit 122 can store the inputted video stream in the first video buffer area of the memory 130.

The first write unit 121 includes a write pointer controller 121-1, a write FIFO controller 121-2, and a write FIFO 121-3. And, the second write unit 122 includes a write pointer controller 122-1, a write FIFO controller 122-2, and a write FIFO 122-3.

As the first and second write units 121 and 122 have the same configuration, a detailed operation of the first write unit 121 is explained in the following.

The write pointer controller 121-1 of the first write unit 121 stores an inputted video ES in the write FIFO 121-3 by packet unit. In doing so, memory write information of a corresponding packet is stored in a corresponding register (not shown in the drawing). Once at least one packet is stored in the write FIFO 121-3, the write FIFO controller 121-2 makes a memory write request to the arbiter interface unit 124. And, the write FIFO controller 121-2 acquires a memory using right from the arbiter interface unit 124 and stores data of the write FIFO 121-3 in the first video buffer area of the memory 130. Likewise, data stored in the write FIFO 122-3 of the second write unit 122 are stored in the second video buffer area of the memory 130.

The arbiter interface unit 124 prepares a write or read request including a memory start address in a format of a command language determined by an arbiter (not shown in the drawing) and then outputs the request to the arbiter. And, the arbiter interface unit 124 makes an address for a subsequent data access. In doing so, in case of a memory write access, an address for the write FIFO 121-3 to read data to be written in the memory 130 is made. In case of a read access, an interface signal for writing the data read from the memory 130 in the read FIFO is made.

The arbiter plays a role as an access relay between the memory 130 and each memory access unit (MAU), and SDRAM or DDR SDRAM is used as the memory 130.

Each of the first and second video decoders 141 and 142 reads the video stream stored in the corresponding video buffer area of the memory 130 via one read unit 123 of the video buffer control unit 120 according to a display sync signal and a decoding unit to perform video decoding thereon. Namely, in reading the video stream for video decoding, each of the first and second video decoders 141 and 142 reads the video stream from the memory 130 via the read unit 123 of the video buffer control unit 120.

In doing so, since the video stream demultiplexed by the system decoder is a packetized elementary stream (PES), the system decoder extracts a video elementary stream (ES) from the video PES only to output to the video buffer control unit 120.

Namely, the video ES is extracted by removing a PES header from the video PES. In doing so, information within the PES header is allowed to be read by a CPU (not shown in the drawing). And, a decoding time stamp (DTS) as information necessary for determining a decoding time in the PES header is inserted in the video ES together with a start code agreed by the video decoders 141 and 142. This information is used as a reference value in waiting by the decoding time for a next picture after the read unit 123 of the video buffer control unit 120 has read the corresponding stamp.

The read unit 123 includes a read controller 123-1, a read FIFO controller 123-2, and a read FIFO 123-3. Namely, the first and second video decoders 141 and 142 share one read unit 123 to read the necessary video streams from the first and second video buffer areas of the memory 130.

Figure 2:
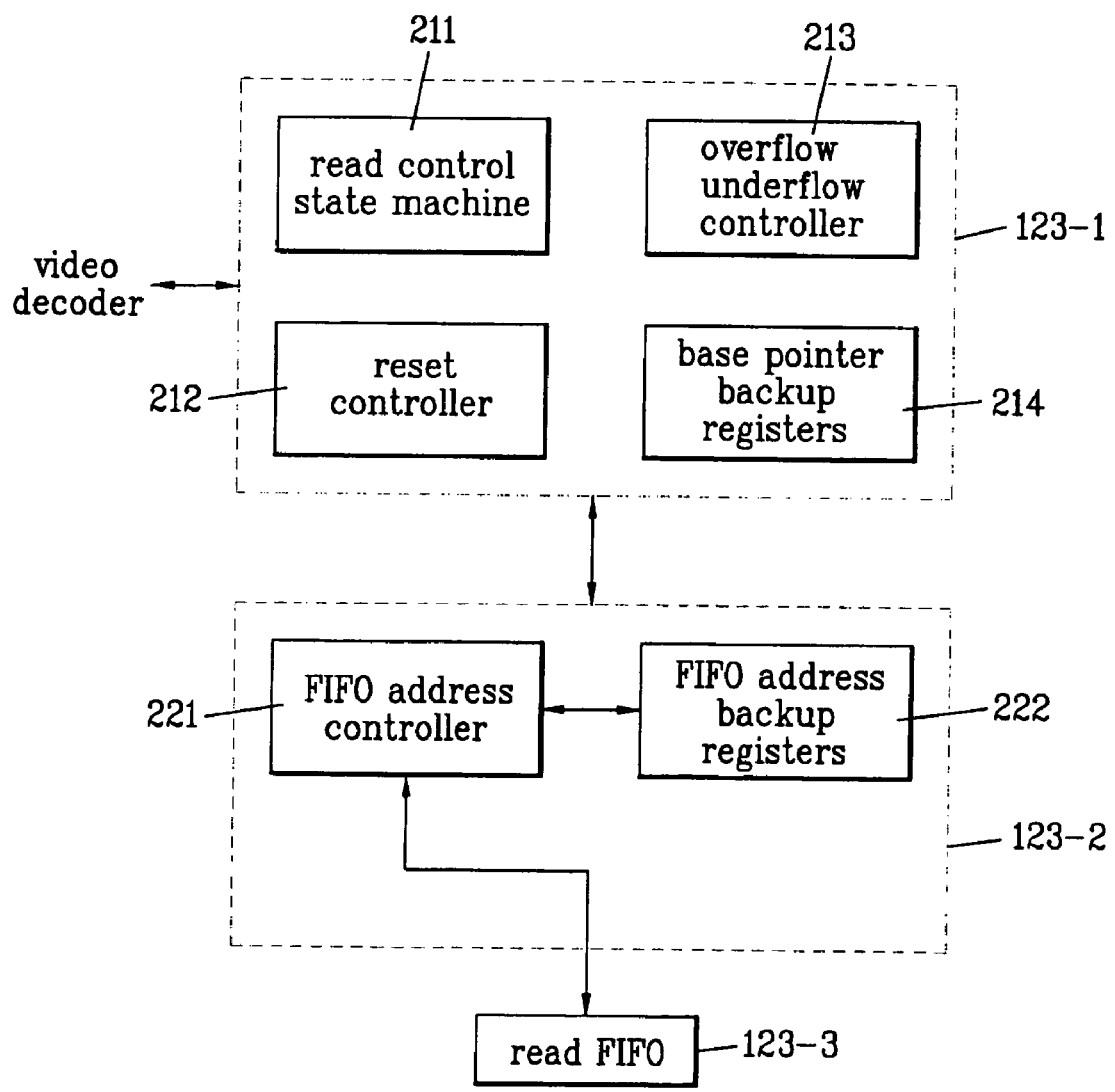
FIG. 2 is a detailed block diagram of a read unit in FIG. 1.

FIG. 2 is a detailed block diagram of the read unit 123 in FIG. 1.

Referring to FIG. 2, the read controller 123-1 and the read FIFO controller 123-2 includes various blocks for controlling an operation of reading data stored in the video buffer by a state of the video buffer and an interoperating operation with the video decoder.

Namely, the read controller 123-1 includes a read control state machine 211, a reset controller 212, an overflow/underflow controller 213, and a register 214.

The read control state machine 211 controls a connection state of an overall operation of a memory read for video decoding. Namely, the machine 211 works in an operational manner of the steps of initialization of the read FIFO 123-3, reads requests from the first and second video decoders 141 and 142, decision of reading the data to be used by the read FIFO 123-3 according to a circumstance of the video buffer from the memory 130, a next read request decision according to a data quantity remaining in the read FIFO 123-3, and the like.

The reset controller 212 outputs a FIFO reset command to the read FIFO controller 123-2 and the write FIFO controllers 121-2 and 122-2 for the initialization of the read FIFO 123-3 and the write FIFOs 121-3 and 122-3 in entirely resetting the first and second video decoders 141 and 142. Moreover, the reset controller 212 outputs the FIFO reset command to the read FIFO controller 123-2 and the write FIFO controllers 121-2 and 122-2 in channel switching while the first and second video decoders 141 and 142 are performing dual video decoding.

The register 214 manages base addresses, which are as many as a number of channels provided to perform a video buffer control on at least two channels, for the channels, respectively. For instance, in case of dual video decoding, the register 214 stores a start address of the first video buffer area and a start address of the second video buffer area.

If a read request is made to the memory 130 with a value of the register in which the base address of the channel that will newly start is stored when channel switching is performed by a request of the video decoder, data of the area indicated by the base address, i.e., data of the corresponding video buffer area of the memory 130 are stored in the read FIFO 123-3. If so, the video decoder reads the data stored in the read FIFO 123-3 to perform video decoding.

The overflow/underflow controller 213 monitors the overflow or underflow of the first and second video buffers. Namely, the overflow/underflow controller 213 receives information of a location where a data write is performed in the video buffer from the write FIFO controllers 121-2 and 122-2. The overflow-underflow controller 213 decides the overflow or underflow of the video buffer using the received information, buffer location and size information within the memory 130 according a system setup, and location information of the video buffer having a current read operation performed therein currently and then informs the video decoder of the corresponding decision. Moreover, the overflow/underflow controller 213 generates an interrupt to be used in the system control via software, if necessary.

Meanwhile, the read FIFO controller 123-2 includes a FIFO address controller 221 and a FIFO address register 222. If the first or second video decoder 141 or 142 requests a video stream for video decoding and if the read control state machine 211 decides a read of the memory 130, the FIFO address controller 221 of the read FIFO controller 123-2 requests a memory read to the arbiter interface unit 124. The arbiter interface unit 124 acquires a memory use right via the arbiter. After having read the video stream from the corresponding video buffer of the memory 130, the arbiter interface unit 124 inputs the read video stream to the FIFO address controller 221 together with a valid signal. The FIFO address controller 221 then stores the read data in the corresponding address within the read FIFO 123-3. And, the FIFO address controller 221 manages data write location information of the read FIFO 123-3.

The read FIFO 123-3 has a size including a data quantity amounting to twice bigger than a read request unit so that a read request to the memory and an operation of the first or second video decoder 141 or 142 to read the data can be sequentially performed.

Hence, the FIFO address controller 221 generates a ready signal if the data having read from the video buffer within the memory 130 by the memory read request is stored in the read FIFO 123-3 to exceed a prescribed quantity. And, the FIFO address controller 221 performs a data read operation within the read FIFO 123-3 by adjusting a read address of the read FIFO 123-3 according to a data read request from the first or second video decoder. The data read from the read FIFO 12303 is outputted to the video decoder having requested the data.

The FIFO address register 222 stores a FIFO read address per channel therein for a video decoding control of several channels. Namely, when the data is read from the read FIFO 123-3 according to the request of the video decoder, the data are read by a size unit of the read FIFO data. If the read FIFO 123-3 is filled with a prescribed quantity, previous read FIFO location information of a newly starting channel is read from the FIFO read register 222. And, the data are read from a location, at which a previous operation of the read FIFO 123-3 was performed, to be outputted to the video decoder having requested the data.

Figure 3:
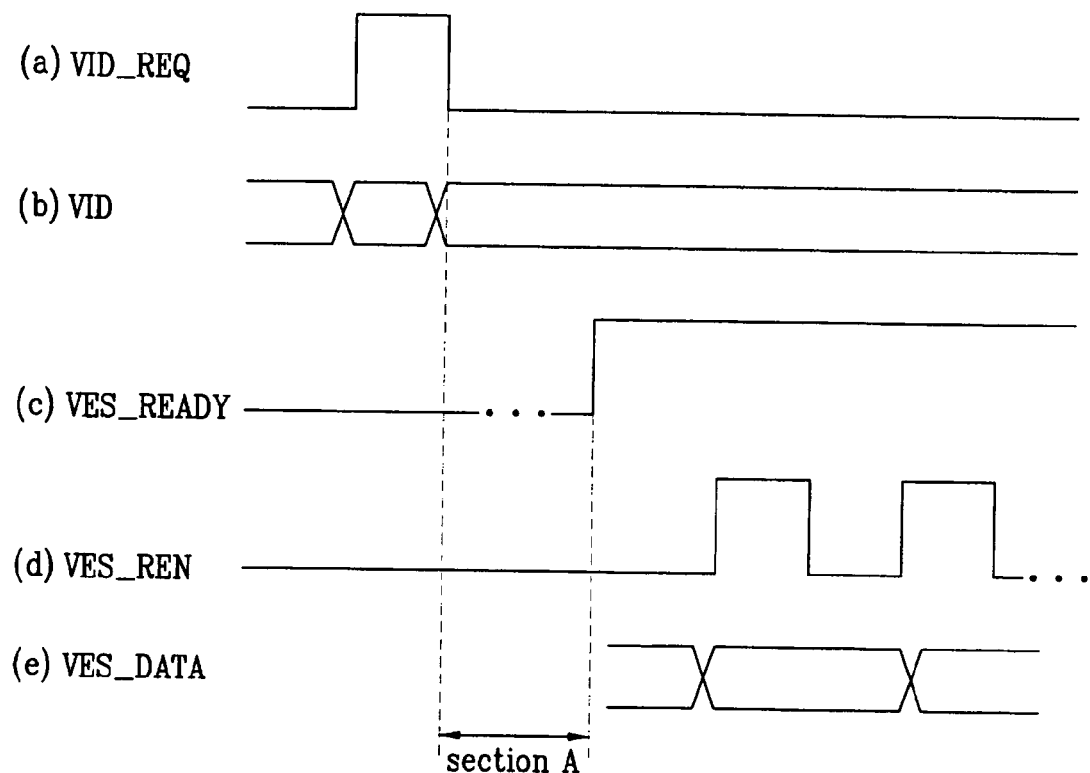
FIG. 3 is a timing diagram of a read operation of a read unit and a video decoder in FIG. 1.

FIG. 3 is a timing diagram of a memory read operation of the video decoder and the read unit 123 of the video buffer control unit 120.

Referring to FIG. 3, once it is confirmed that the first or second write unit 121 or 122 stores the video stream of at least one frame in the video buffer of the corresponding channel and that the video stream exceeding a prescribed size is stored in the video buffer of the corresponding channel, the video decoder requests a read request for the corresponding channel to the read unit 123. In doing so, read request signals outputted from the video decoder are a VID_REQ signal of (a) in FIG. 3 and a corresponding channel ID (VID) of (b) in FIG. 3.

Subsequently, the read controller 123-1 of the read unit 123 makes a memory read request to the arbiter interface unit 124, and simultaneously, the read FIFO controller 123-2 stores contents of a read operation situation for a previous channel in the corresponding register and prepares for a new FIFO read.

In case of acquiring a memory use right via the arbiter interface unit 124, the read FIFO controller 123-2 reads the video stream from the video buffer storing the video stream corresponding to the channel ID (VID) to store in the read FIFO 123-3.

If the video stream is stored in the read FIFO 123-3 to exceed a prescribed quantity, the read FIFO controller 123-2 outputs a VES_READY signal, as shown in (c) of FIG. 3, to the corresponding video decoder and then outputs data (VES_ DATA), as shown in (e) of FIG. 3, stored in the read FIFO 123-3 to the video decoder. The video decoder performs video decoding on the inputted data (VES_DATA) in (e) of FIG. 3 by turning on a VES_REN signal as shown in (d) of FIG. 3. In doing so, a section-A in (e) of FIG. 3 is a ready period taken for the data, which was read from the corresponding video buffer according to the memory read request, to be stored in the read FIFO 123-3. The section-A can be variable according to an operational situation of another video buffer within the memory.

Meanwhile, the read controller 123-1 can set up a storage area to perform decoding on a small quantity of MPEG1 or MPEG2 video data stored in the video buffer of the channel that is not used or the memory area except the video buffer by the CPU. For this, a video buffer point of a specific channel is set to a position for CPU data processing and a corresponding mode is set. If so, the video decoder, as shown in FIG. 3, makes a read request of CPU data to the read unit 123 of the video buffer control unit 120. If so, the read controller 123-1 of the read unit 123 reads the CPU data from the corresponding area of the memory, stores the read data in the read FIFO 123-3, and then outputs the stored data to the video decoder having requested the CPU data. The video decoder then receives the requested CPU data to perform decoding thereon.

Such a function can be applied to a special voice channel, a display of a background image for channel introduction in channel switching, data broadcasting, etc., which enables fast data processing using the conventional hardware.

Meanwhile, the digital TV receiver of the present invention can perform a decoding function of video recorded in a digital versatile disc (DVD) or a stream recorded in a hard disc (HDD) and the like. For this, the overflow/underflow controller 213 of the read controller 123-1 informs the system decoder that the data exceeding a prescribed quantity is stored in the video buffer, thereby controlling the video stream to be uploaded to the video buffer. In doing so, for the stability of the upload operation, input ready signals in turning on/off an upload are controlled to operate by different reference values, respectively. By differentiating the reference values, it is able to prevent an upload-available situation from being changed abruptly and unstably.

Another method of preventing the abrupt change of the upload-available situation can be implemented in the following manner. First of all, an input ready signal is turned on. And, an 'off' of an input ready signal is then checked after a delay of a prescribed time. Hence, a prescribed time interval between 'on' and 'off' of the input ready signal can be secured.

Meanwhile, if a sequence end code is encountered or if an input of the video stream is interrupted for a prescribed time since a bit stream is inputted at a very low bit rate, the first and second write units 121 and 122 support a stuffing operation of clearing all data remaining in the video buffer.

Figure 4:
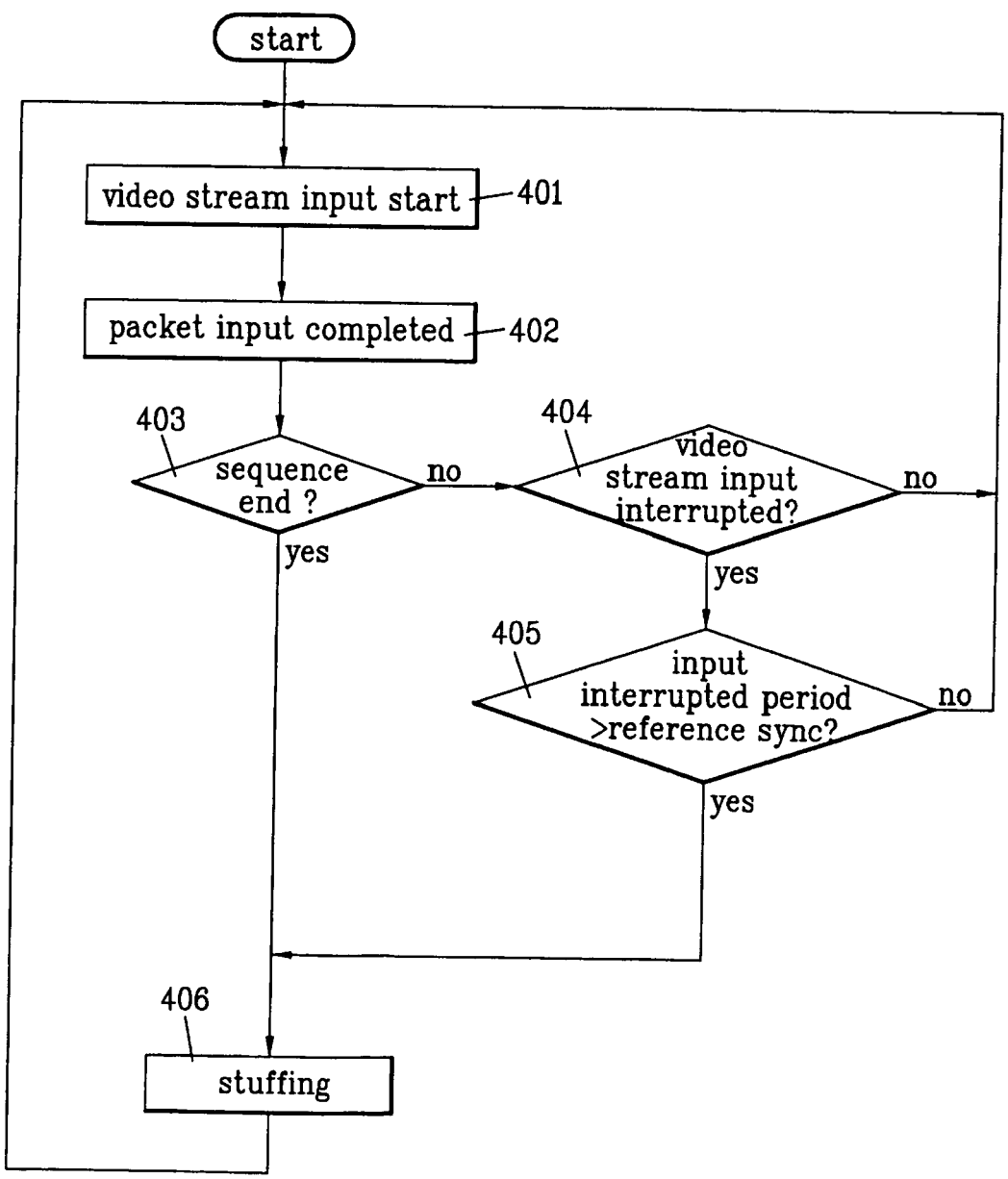
FIG. 4 is a flowchart of a stuffing operation of a read unit in FIG. 1.

FIG. 4 is a flowchart of a stuffing operation of a read unit in FIG. 1.

Referring to FIG. 4, a video stream starts to be inputted (step 401). If an input of the video stream of one packet is completed (step 402), it is checked whether a sequence end code indicating an end of a frame including the video stream is inputted (step 403).

If the sequence end code is inputted in the step 403 and if a mode of completely clearing a corresponding buffer is set, a write unit receiving the video stream performs a stuffing operation of storing null data causing no influence on video decoding in the corresponding video buffer (step 406). A quantity of the null data corresponds to a size of the read FIFO 123-3 of the read unit 123.

If it is decided that the sequence end code is not inputted in the step 403, it is checked whether the input of the video stream is interrupted (step 404). If it is decided that the input of the video stream is interrupted in the step 404, it is checked whether an interrupted period is longer than a predefined reference sync period (step 405). If the interrupted period is longer than the predefined reference sync period in the step 405, the above stuffing operation is performed. If not, it goes back to the step 401 to repeat the above steps. In this case, the reference sync is a signal for deciding whether to perform the stuffing operation in case that the video stream fails to be inputted for a prescribed time and can be implemented to be set to an appropriate value according to a situation of the applied system.

Meanwhile, the terminologies used in the description of the present invention are defined to take the functions in the present invention into consideration and may vary according to intentions or conventions of those skilled in the art. Hence, the definitions of the terminologies should be made based on the overall contents of the present invention.

As mentioned in the foregoing description of the video buffer control apparatus for dual video decoding and the digital broadcasting receiver, one read block controls the reading of at least two video buffers in performing video decoding on at least two channels, whereby the video buffers can be efficiently controlled and whereby the hardware size of the video buffer control apparatus can be reduced.

Moreover, the present invention can simultaneously decode both of the digital broadcasting and a video clip or MPEG still picture having a data format inputted via path different from that of the digital broadcasting. Specifically, the present invention can provide various conveniences and additional functions to a user in the expensive digital TV system. And, the present invention can configure SOC (system on chip) with a minimum cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital broadcasting receiver comprising a plurality of system decoders, a dual video decoder, a first video buffer area temporarily storing a first video stream corresponding to a first channel and a second video buffer area temporarily storing a second video stream corresponding to a second channel, the first and second video streams separated by the plurality of the system decoders, and a video buffer control apparatus for dual video decoding, the video buffer control apparatus comprising:

a first write unit configured to receive and temporarily store the first video stream in the first video buffer area, wherein the first write unit performs stuffing on the first video buffer area if an input of the received first video stream is interrupted for a predetermined time;

a second write unit configured to receive and temporarily store the second video stream in the second video buffer area, wherein the second write unit performs stuffing on the second video buffer area if an input of the received second video stream is interrupted for the predetermined time; and a read unit configured to enable concurrent processing of the first and second video streams by storing a first base address of the first video buffer area and a second base address of the second video buffer area and reading and temporarily storing the first video stream from the first video buffer area and the second video stream from the second video buffer area using the first and second base addresses in response to a request by the dual video decoder to decode the first and second video streams, and provide the temporarily stored first and second video streams to the dual video decoder.

2. The video buffer control apparatus of claim 1, wherein the first write unit comprises:

a write FIFO configured to temporarily store storing the received first video stream;

a write pointer controller configured to store the first video stream in the write FIFO by packet unit; and a write FIFO controller configured to read the video stream stored in the write FIFO if at least one packet is stored in the write FIFO and store the read video stream in the first video buffer area.

3. The video buffer control apparatus of claim 1, wherein the second write unit comprises:

a write FIFO configured to temporarily store the received second video stream;

a write pointer controller configured to store the second video stream in the write FIFO by packet unit; and a write FIFO controller configured to read the video stream stored in the write FIFO if at least one packet is stored in the write FIFO and store the read video stream in the second video buffer area.

4. The video buffer control apparatus of claim 1, wherein the read unit comprises:

a read FIFO configured to temporarily store the video streams stored in the first and second video buffer areas;

a read controller configured to control read operations of the first and second video buffer areas according to states of the first and second video buffer areas and a read request from the dual video decoder; and a read FIFO controller configured to read the first or second video stream requested by the dual video decoder via the read controller from the first and second video buffer areas and store the read first or second video stream in the read FIFO, the read FIFO controller reading the first or second video stream to output to the dual video decoder if a predetermined quantity of the first or second video stream is stored in the read FIFO.

5. The video buffer control apparatus of claim 4, wherein the read controller comprises:

a read control state machine configured to write data read from a memory in the read FIFO according to an initialization of the read FIFO, the read request from the dual video decoder, and the states of the first and second video buffer areas;

a reset controller configured to provide a control signal for an overall initialization of the dual video decoder or initializations of the read FIFO and the write FIFO during channel switching;

a register configured to store first and second base addresses of the first and second video buffer areas; and an overflow/underflow controller configured to inform the dual video decoder of an overflow or underflow of the first or second video buffer area if the overflow or underflow is confirmed.

6. The video buffer control apparatus of claim 5, wherein the read control state machine reads the first or second video stream from the first or second video buffer area corresponding to a value of the register storing the base address of a switched channel when channel switching is performed in response to a request by the dual video decoder.

7. The video buffer control apparatus of claim 5, wherein the overflow/underflow controller determines the overflow or the underflow using location information stored in the write FIFO controller indicating the first or second video buffer area into which the video stream is written, a video buffer location and size information according to a system setup, and a video buffer location information indicating a location which is currently read.

8. The video buffer control apparatus of claim 4, wherein the read FIFO controller comprises:

a FIFO read register configured to store a FIFO read address for each of the first and second channels for a dual video decoding control; and a FIFO address controller configured to manage data write location information of the read FIFO, read the first or second video stream of the first or second channel requested by the dual video decoder from the first or second video buffer area under control of the read controller to store the read first or second video stream in the read FIFO, and read the first or second video stream from the read FIFO to output to the dual video decoder according to a value of the FIFO read register if a predetermined quantity of the video stream is stored in the read FIFO.

9. A digital broadcasting receiver for dual video decoding, the digital broadcasting receiver comprising:
- a plurality of system decoders configured to separate an input transport stream into first and second video streams, wherein each of the first and second video streams corresponds to a program;
- an external memory comprising a first video buffer area to temporarily store the first video stream and a second video buffer area to temporarily store the second video stream for video decoding;
- a first write unit configured to receive the first video stream from the system decoder and temporarily store the first video stream in the first video buffer area of the external memory, wherein the first write unit performs stuffing on the first video buffer area if an input of the received first video stream is interrupted for a predetermined time;
- a second write unit configured to receive the second video stream from the system decoder and temporarily store the second video stream in the second video buffer area of the external memory, wherein the second write unit performs stuffing on the second video buffer area if an input of the received second video stream is interrupted for the predetermined time;
- a dual video decoder configured to perform dual video decoding on the first and second video streams stored in the first and second video buffer areas; and
- a read unit configured to enable concurrent processing of the first and second video streams by storing a first base address of the first video buffer area and a second base address of the second video buffer area and reading and temporarily storing the first video stream from the first video buffer area and the second video stream from the second video buffer area using the first and second base addresses in response to a request by the dual video decoder to decode the first and second video streams, and provide the temporarily stored first and second video streams to the dual video decoder.

10. The digital broadcasting receiver of claim 9, wherein the first write unit comprises:
- a write FIFO configured to temporarily store the first video stream provided by the system decoder;
- a write pointer controller configured to store the first video stream in the write FIFO by packet unit; and
- a write FIFO controller configured to read the first video stream stored in the write FIFO if at least one packet is stored in the write FIFO and store the read first video stream in the first video buffer area of the external memory.

11. The digital broadcasting receiver of claim 9, wherein the second write unit comprises:
- a write FIFO configured to temporarily store the second video stream provided by the system decoder;
- a write pointer controller configured to store the second video stream in the write FIFO by packet unit; and
- a write FIFO controller configured to read the second video stream stored in the write FIFO if at least one packet is stored in the write FIFO and store the read second video stream in the second video buffer area of the external memory.

12. The digital broadcasting receiver of claim 9, wherein the read unit comprises:
- a read FIFO configured to temporarily store the video streams stored in the first and second video buffer areas of the external memory;
- a read controller configured to control read operations of the first and second video buffer areas according to states of the first and second video buffer areas and a read request from the dual video decoder; and
- a read FIFO controller configured to read the first or second video stream requested by the dual video decoder via the read controller from the first and second video buffer areas and store the read first or second video stream in the read FIFO, the read FIFO controller reading the first or second video stream to output to the dual video decoder if a predetermined quantity of the first or second video stream is stored in the read FIFO.

13. The digital broadcasting receiver of claim 12, wherein the read FIFO has a size including a data quantity twice as large as a read request unit such that a read request to the first or second video buffer area and an operation of the dual video decoder to read data can be sequentially performed.

14. The digital broadcasting receiver of claim 12, wherein the read controller comprises:
- a read control state machine configured to write data read from a memory in the read FIFO according to an initialization of the read FIFO, the read request from the dual video decoder, and the states of the first and second video buffer areas;
- a reset controller configured to provide a control signal for an overall initialization of the dual video decoder or initializations of the read FIFO and the write FIFO during channel switching;
- a register configured to store the first and second base addresses of the first and second video buffer areas therein; and
- an overflow/underflow controller configured to inform the dual video decoder of an overflow or underflow of the first or second video buffer area if the overflow or underflow is confirmed.

15. The digital broadcasting receiver of claim 14, wherein the read control state machine reads the first or second video stream from the first or second video buffer area of the memory corresponding to a value of the register storing the first or second base address of a switched channel when channel switching is performed in response to a request by the dual video decoder.

16. The digital broadcasting receiver of claim 14, wherein the overflow/underflow controller determines the overflow or the underflow using location information stored in the write FIFO controller indicating the first and second video buffer area within the memory into which the video stream is written, a video buffer location and size information according to a system setup, and a video buffer location information indicating a location which is currently read.

17. The digital broadcasting receiver of claim 14, wherein the system decoder uploads the video stream to the first or second video buffer area in response to an overflow signal provided by the overflow/underflow controller.

18. The digital broadcasting receiver of claim 12, wherein the read FIFO controller comprises:
- a FIFO read register configured to store a FIFO read address for each of the first and second channels for a dual video decoding control; and
- a FIFO address controller configured to manage data write location information of the read FIFO, read the first or second video stream of the first or second channel requested by the dual video decoder from the first or second video buffer area under control of the read controller to store the read first or second video stream in the read FIFO, and read the first or second video stream from the read FIFO to output to the dual video decoder according to a value of the FIFO read register if a predetermined quantity of the first or second video stream is stored in the read FIFO.

19. A digital broadcasting receiver comprising a plurality of system decoders, a dual video decoder, a first video buffer area temporarily storing a first video stream corresponding to a first channel and a second video buffer area temporarily storing a second video stream corresponding to a second channel, the first and second video streams separated by the plurality of the system decoders, and a video buffer control apparatus for dual video decoding, the video buffer control apparatus comprising:

a first write unit configured to receive and temporarily store the first video stream in the first video buffer area, wherein the first write unit performs stuffing on the first video buffer area if a sequence end code is detected from the received first video stream;

a second write unit configured to receive and temporarily store the second video stream in the second video buffer area, wherein the second write unit performs stuffing on the second video buffer area if a sequence end code is detected from the received second video stream; and a read unit configured to enable concurrent processing of the first and second video streams by storing a first base address of the first video buffer area and a second base address of the second video buffer area and reading and temporarily storing the first video stream from the first video buffer area and the second video stream from the second video buffer area using the first and second base addresses in response to a request by the dual video decoder to decode the first and second video streams, and provide the temporarily stored first and second video streams to the dual video decoder.

20. A digital broadcasting receiver for dual video decoding, the digital broadcasting receiver comprising:

a plurality of system decoders configured to separate an input transport stream into first and second video streams, wherein each of the first and second video streams corresponds to a program;

an external memory comprising a first video buffer area to temporarily store the first video stream and a second video buffer area to temporarily store the second video stream for video decoding;

a first write unit configured to receive the first video stream from the system decoder and temporarily store the first video stream in the first video buffer area of the external memory, wherein the first write unit performs stuffing on the first video buffer area if a sequence end code is detected from the received first video stream;

a second write unit configured to receive the second video stream from the system decoder and temporarily store the second video stream in the second video buffer area of the external memory, wherein the second write unit performs stuffing on the second video buffer area if a sequence end code is detected from the received second video stream;

a dual video decoder configured to perform dual video decoding on the first and second video streams stored in the first and second video buffer areas; and a read unit configured to enable concurrent processing of the first and second video streams by storing a first base address of the first video buffer area and a second base address of the second video buffer area and reading and temporarily storing the first video stream from the first video buffer area and the second video stream from the second video buffer area using the first and second base addresses in response to a request by the dual video decoder to decode the first and second video streams, and provide the temporarily stored first and second video streams to the dual video decoder.

* * * * *